July 26, 1949.    C. W. PACKWOOD    2,477,494
MEANS FOR CONTROLLING THE FLOW OF LIQUIDS
Filed Jan. 5, 1946
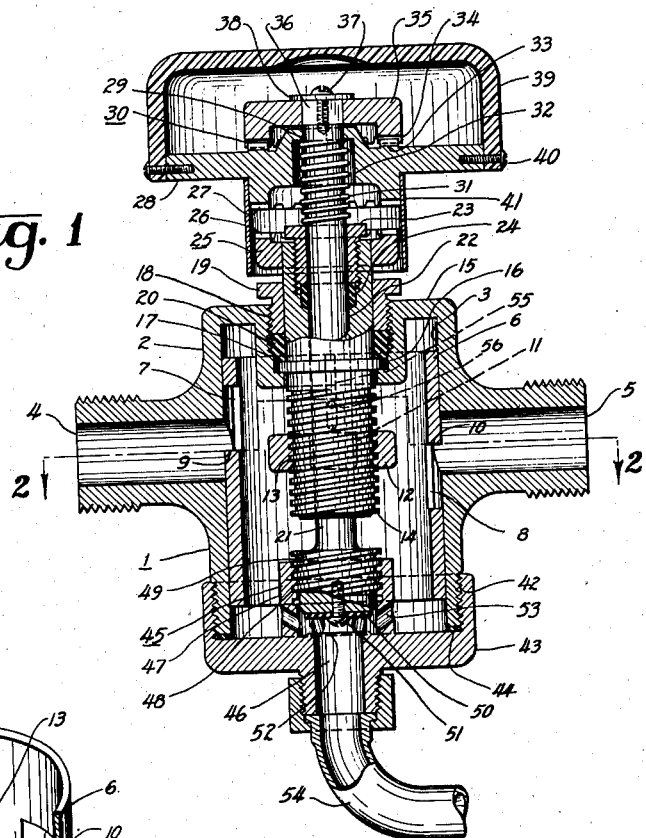
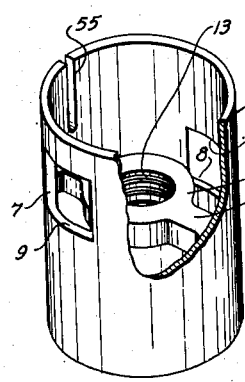
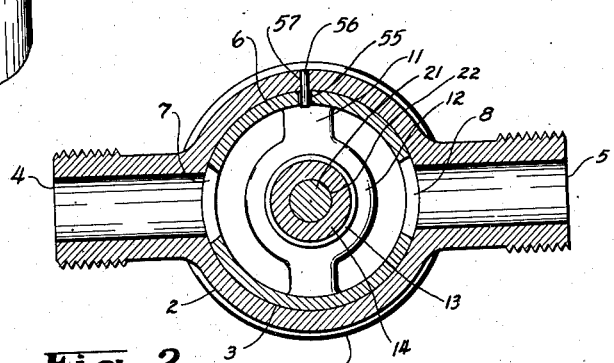
INVENTOR.
CHARLES W. PACKWOOD
BY
AGENT.

Patented July 26, 1949

2,477,494

UNITED STATES PATENT OFFICE 2,477,494

MEANS FOR CONTROLLING THE FLOW OF LIQUIDS

Charles W. Packwood, Cedar Rapids, Iowa, assignor of eighteen and one-fourth per cent to John Henry Ashton, eighteen and one-fourth per cent to Mary Frazier Ashton, both of West Liberty, and twelve and one-half per cent to Scott A. Anderson, Des Moines, Iowa Application January 5, 1946, Serial No. 639,345

7 Claims. (Cl. 277—18)

This invention relates generally to valves for controlling the flow of fluids and is more particularly concerned with a combined mixing valve and rate of flow controlling means.

The object of this invention is the provision of a combined mixing and volume controlling valve having a single operating handle movable in a plurality of positions for controlling both the mixture of two fluids and the rate of flow of the mixture.

Another primary object of my invention is the provision of a mixture and volume control valve so constructed that adjustment of the temperature may be accomplished without affecting the rate of flow and vice versa and further—a valve in which the setting of the temperature control will remain constant and unaffected by repeated openings and closings of the flow control portion of the valve.

More particularly, it is a feature of this invention to provide a first valve member slideable in one direction for providing a mixture control for supplies of two fluids and a separate rotatable member for controlling the rate of flow of the mixture, with common means for controlling or actuating said members.

A further object of my invention is the provision of a valve of this nature of relatively simple construction and one which may be manufactured at relatively low cost.

These and other and further features and objects of the invention will be more apparent to those skilled in the art upon a consideration of the accompanying drawings and following specification, wherein is disclosed an exemplary embodiment of the invention, with the understanding, however, that such changes may be made therein as fall within the scope of the appended claims, without departing from the spirit of the invention.

In the drawings:

Figure 1 is a sectional view of a preferred form of valve mechanism in which the principles of the present invention have been embodied.

Figure 2 is a sectional view taken generally along the line 2—2 of Figure 1.

Figure 3 is a perspective view of the slideable proportioning valve member employed in the device illustrated in Figure 1.

The complete valve is indicated by the reference numeral 1 and comprises a valve body 2 having a cylindrical interior chamber 3 with a pair of oppositely arranged ports 4 and 5 which may, for example, be connected with suitable sources of hot and cold water, respectively, or to two sources of supply of two other fluids or gases to be mixed at varying proportions. It is desirable that the pressure be substantially the same on both sources of supply.

A slideable valve sleeve or valve closure member 6, generally tubular in form, is mounted for longitudinal movement within the cylindrical chamber 3 and is preferably made of a size such that its longitudinal movement is limited by the upper and lower walls of said chamber. This valve sleeve 6 is provided with a pair of apertures 7 and 8 on opposite sides thereof and adapted to be selectively aligned with the adjacent ports 4 or 5. These apertures 7 and 8 are preferably rectangular in shape with the long edges thereof extending circumferentially about the sleeve and with their height equal to the diameter of the port with their height equal to the diameter of the port 4 or 5, said ports preferably being of the same size. The two apertures 7 and 8 are not diametrically opposite one another but the upper edge 10 of the aperture 8 is positioned so as to be exactly opposite the lower edge 9 of the other aperture 7. Thus, for example, it will be seen that, for whatever portion of the port 4 that is opened, a corresponding portion of the port 5 will be closed. The total effective area of the two ports will, at any and all times, remain the equivalent of the full free area of either one of the ports.

The valve sleeve 6 is provided with a transversely extending rib 11 having an enlarged portion 12 at the center of the sleeve, which enlarged portion is drilled and threaded as at 13 to receive a threaded mixture control rod 14, which member extends through the upper wall 15 of the valve body 2. This mixture control rod 14 is provided with a shoulder 16 adapted to bear against the upper surface of the valve body and to lie within the sealing well 17. This sealing well is threaded as at 18 to receive a packing nut 19, which member is employed to keep the sealing or packing material 20 properly compacted.

A volume control stem 21 is received for rotation and sliding movement within an opening 22 extending centrally the length of the mixture control rod 14. The juncture of this volume control stem 21 and the mixture control rod 14 is sealed by means of the packing nut 23 threaded into a recess in the upper end of the mixture control rod 14 and bearing upon the packing material 24 within said recess.

One portion of a clutch 25 is secured to the upper end of the mixture control rod 14 by means of a pressure fit or by brazing or the like, this clutch member being provided with dogs or toothed portions as at 26. These toothed portions are adapted for engagement with companion toothed portions 27 formed on the undersurface of a control handle 28, this control handle being received for free rotating and sliding movement at 29 on the volume control stem 21. The control handle 28 is normally biased upwardly and the mixture control clutch 25 disengaged by means of a compression spring 31 disposed around the volume control stem 21 and within the recess 32 of the handle 28.

A volume control clutch 30 is disposed generally above the control handle 28. The upper surface of the valve handle is provided with a clutch face or toothed portion 33 and this clutch face is normally held in engagement, by means of the compression spring 31, with the toothed clutch face 34 of a clutch member 35 which is, in turn, secured in fixed relation to the upper end of the volume control stem 21. This may be accomplished by squaring the upper end of the stem as at 36 for reception within a squared hole in the clutch member 35 and retained in place by means of the threaded screw 37 and washer 38. The entire clutch mechanism 30 above the control handle 28 is preferably enclosed by a cover member 39 of molded plastic or the like and secured in place by means such as the threaded screws 40 tapped into the outer edge of control handle 28.

The lower clutch mechanism 25 is preferably enclosed by means of a tubular shield 41 which may be a force fit over the outer surface of the lower clutch member 27 on the control handle 28. The body of the lower element of the clutch 25 is of slightly less diameter than the inside diameter of the guard sleeve 41 so that the clutch parts may freely move relative to one another.

The lower end of the valve housing 2 is threaded as at 42 to receive a cap 43, a sealing member 44 being interposed between the adjoining sealing surfaces of the valve body and the cap 43.

A discharge valve structure 45 is provided as a part of the cap 43 adjacent the discharge port 46 and in axial alignment with the volume control stem 21.

The discharge valve structure 45 is comprised generally of a cylindrical body portion 47 formed as a part of and upstanding from the cover member 43. This body portion 47 is recessed and threaded as at 48 to receive the threaded, enlarged portion 49 of the lower end of the volume control stem 21. The bottom surface of this volume control stem is provided with a fibre sealing washer 50 secured thereto by means of the screw 51. This fibre washer is adapted to contact and provide a seal against the raised sealing edge 52 of the discharge port 46. A plurality of openings 53 are provided through the walls of the body portion of the volume control valve structure to provide communication between the interior of the main valve chamber and the discharge port 46.

Any suitable means, such as a swing spout, a portion of which is indicated at 54, may be employed for conducting the mixture away from the discharge port.

In order to prevent rotation of the valve sleeve 6, this sleeve is slotted downwardly from its upper edge as indicated at 55 and a taper pin 56 or the like is driven through an opening 57 drilled in the outer wall of the main valve body 2. This pin 56 is so positioned as to permit vertical sliding action of the valve sleeve 6 within the valve chamber 3 but at all times retaining the openings 7 and 8 through the sleeve in proper alignment with the ports 4 and 5.

The operation and the manner of using this valve is as follows.

The control handle 28 is normally held, by means of the spring 31, in operative connection with the clutch member 35 and thus in direct connection with the volume control stem 21; therefore, rotation of this control handle 28 will serve to open or close the volume control valve 45 by selectively screwing or unscrewing the threaded, enlarged portion 49 of the valve stem into the valve housing 47 thus lifting or lowering the fibre disc 50 relative to the valve seat 52 as desired, leakage along the valve stem being prevented by means of the packing gland or packing nut 23.

If the valve is being employed as a mixing valve for supplies of hot and cold water and if the temperature of the water is not as desired, the control handle 28 is pressed downwardly against the action of the compression spring 31 in order to disengage the volume control clutch 30 and engage the temperature control clutch 25. As long as this temperature control clutch is held in engagement, rotation of the control handle 28 will serve to rotate the mixture control rod 14 and it will be readily understood that, as this rod is rotated in one direction or the other, the sliding sleeve 6 will be selectively caused to move up or down.

If the left hand port 4 in the drawings is assumed to be a hot water inlet and the port 5 is a cold water inlet, it may be readily understood that rotation of the operating handle 28 in a clockwise direction will cause the valve sleeve 6 to be lifted upwardly within the interior chamber 3 to decrease the opening of the port 4 and increase the opening of the port 5. This results in a decrease of the proportion of hot water and an increase of the proportion of cold water without effecting any change at all in the total volume of fluid being fed into the interior of the valve. A full 100 per cent flow of fluid is permitted at all times by the mixture control mechanism, the flow being dependent only upon the volume control mechanism.

It will be obvious also that this temperature control mechanism may be left in any desired position to permanently maintain any desired proportion of hot and cold water. The regulation of the volume of the mixture discharged through the discharge port 46 is entirely under the control of the volume control mechanism and entirely independent of the temperature control mechanism although controlled by the same operating handle.

It will be understood that devices constructed in accordance with my invention may be employed in the handling or mixing of gases as well as fluids other than water. Such a valve may, for example be employed in making chemical mixtures by constructing the valve of suitable, non-corrosive materials.

Although I have described a specific embodiment of my invention, it is apparent that modifications thereof may be made by those skilled in the art. Such modifications may be made without departing from the spirit and scope of my invention as set forth in the appended claims.

What I claim is:

1. A valve comprising a valve body having a pair of inlets, a single outlet, a member movable in one direction for opening one of said inlets and closing the other inlet, means in said valve body for guiding said member, a rotatable valve stem having a valve closure at one end, screw threaded means carried by said valve body and receiving said valve closure end of the valve stem, a handle mounted on the upper end of said stem and means for selectively engaging the handle with said movable member or said valve stem, whereby said handle may be used for opening and closing said outlet and for proportioning the flow through said pair of inlets.

2. In a valve having a valve chamber, means forming three ports communicating with the interior of said chamber, a rotatable valve structure for controlling fluid flow through one of said ports, a mixture control member movable in said chamber generally across both of the other ports, said member selectively movable in one direction to open the first of said other ports and closing the second of said other ports or in the other direction for opening the second of said other ports and closing the first of said other ports, an operating handle and means for selectively engaging said operating handle with said rotatable valve or said mixture control member.

3. A valve comprising a valve chamber having three ports communicating with the interior thereof, two of which are disposed generally in opposite sides thereof, a shiftable member slideably disposed within said chamber movable in one direction for progressively opening the first of said opposite ports and progressively closing the other, said shiftable member being also movable in the other direction for progressively opening said other port and progressively closing said first port, a rotatable valve stem, a valve closure on said stem, screw threaded means associated with said rotatable stem whereby rotation of said stem causes said valve closure to control the flow through the third of said three ports, a handle mounted on said valve stem for rotating the latter, and means rendered operable by longitudinal movement of said handle on said stem in any position of rotation of the stem for disengaging said valve stem and shifting said shiftable member.

4. In a fluid flow and temperature control valve the combination of a body having a valve chamber, inlet ports and an outlet port, a sleeve slideably disposed within said body and having openings through the side walls thereof for selectively covering or uncovering said inlet ports, a volume control valve for closing said outlet port, co-axially aligned valve stems for moving said valve sleeve and said volume control valve, a control handle and clutch means for selectively engaging the said control stems whereby selective control of either mixture or fluid flow may be had.

5. A valve comprising a valve body having a generally cylindrical valve chamber therein, the valve chamber having two inlet ports in the cylindrical wall thereof and an outlet port in one end wall thereof, a sleeve valve slidably longitudinally within the valve chamber and having a pair of mixing ports selectively alignable with the inlet ports, a rotatable hollow stem, extending through an opening in the other end wall of the valve chamber, threadedly engaged with the said sleeve valve, an outlet valve arranged to close the outlet port, a valve stem secured to said outlet valve and extending through said hollow stem, a control handle rotatably mounted on the valve stem outside the valve body, and clutch means associated with the handle selectively engageable with the valve stem or the hollow stem whereby selective control of the sleeve valve or outlet valve may be had.

6. A valve comprising a valve body having a generally cylindrical valve chamber therein and three valve ports communicating therewith, two of said ports comprising inlet ports arranged in generally diametrically opposed relation, the third of said valve ports comprising an outlet port arranged in one end wall of the said chamber, a sleeve valve slideable longitudinally within the valve chamber and having a pair of mixing ports in generally diametrically opposed and longitudinally offset relation, a rotatable hollow stem extending through an end wall of the valve chamber threadedly engaged with said sleeve valve, an outlet valve arranged to selectively open or close the outlet port, a valve stem secured to said outlet valve and extending through the said hollow stem, a control handle rotatably mounted on the valve stem outside the valve body, and clutch means associated therewith and selectively engageable with the valve stem or the hollow stem whereby selective control of the sleeve member or outlet valve may be had.

7. A valve comprising a valve body having a generally cylindrical valve chamber therein, the valve body having two inlet ports located in the cylindrical wall of the valve chamber and an outlet port disposed in an end wall of said chamber, a sleeve valve in the valve chamber movable to selectively vary the relative effective areas of the inlet ports, a rotatable hollow stem extending through the other end wall of the valve body and operatively connected with said sleeve valve, an outlet valve arranged to close the outlet port, a valve stem secured to said outlet valve and extending through said hollow stem, a control handle rotatably mounted on the said valve stem outside the valve body, and clutch means associated with the handle selectively engageable with the valve stem or the hollow stem whereby selective or independent operation of the sleeve valve or outlet valve may be had through manipulation of a single control handle.

CHARLES W. PACKWOOD.

REFERENCES CITED

The following references are of record in the file of this patent:

UNITED STATES PATENTS

| Number | Name | Date |
|---|---|---|
| 1,882,953 | Saelzler | Oct. 18, 1932 |
| 2,050,273 | Chamberlin | Aug. 11, 1936 |
| 2,083,360 | Brinkman | June 8, 1937 |
| 2,158,342 | Trader | May 16, 1939 |